United States Patent
Vig

(10) Patent No.: US 8,059,964 B2
(45) Date of Patent: Nov. 15, 2011

(54) QKD SYSTEM WITH COMMON-MODE DITHERING

(75) Inventor: Harry Vig, North Billerica, MA (US)

(73) Assignee: MagiQ Technologies, Inc., Somerville, MA (US)

( * ) Notice: Subject to any disclaimer, the term of this patent is extended or adjusted under 35 U.S.C. 154(b) by 1140 days.

(21) Appl. No.: 11/880,340

(22) Filed: Jul. 20, 2007

(65) Prior Publication Data

US 2009/0022326 A1    Jan. 22, 2009

(51) Int. Cl.
*H04L 9/08* (2006.01)
*H04L 9/28* (2006.01)

(52) U.S. Cl. ........ 398/140; 398/141; 380/256; 380/277; 380/278; 380/283

(58) Field of Classification Search ................ 398/9, 16, 398/25–38
See application file for complete search history.

(56) References Cited

U.S. PATENT DOCUMENTS

| | | | | |
|---|---|---|---|---|
| 4,469,942 | A * | 9/1984 | Srivastava | 250/252.1 |
| 5,515,438 | A * | 5/1996 | Bennett et al. | 380/278 |
| 6,236,488 | B1 | 5/2001 | Shimizu et al. | |
| 6,445,478 | B2 | 9/2002 | Shimizu et al. | |
| 6,462,825 | B1 | 10/2002 | Wiebesick et al. | |
| 2005/0047601 | A1* | 3/2005 | Shields et al. | 380/283 |
| 2006/0016972 | A1* | 1/2006 | Lagasse | 250/238 |
| 2006/0018475 | A1* | 1/2006 | Vig et al. | 380/256 |
| 2006/0088159 | A1* | 4/2006 | Mitchell et al. | 380/46 |
| 2006/0239460 | A1* | 10/2006 | Young | 380/256 |
| 2006/0239463 | A1* | 10/2006 | Young | 380/278 |
| 2007/0064945 | A1* | 3/2007 | Yuan et al. | 380/263 |
| 2007/0133799 | A1* | 6/2007 | Vig et al. | 380/256 |
| 2007/0160212 | A1* | 7/2007 | Zavriyev et al. | 380/256 |
| 2008/0292102 | A1* | 11/2008 | Wang et al. | 380/275 |

FOREIGN PATENT DOCUMENTS

WO    WO 9404889    3/1994

OTHER PUBLICATIONS

Stucki et al, "Photon counting for quantum key distribution with Peltier cooled InGaAs/InP", http://arxiv.org quant-ph/0106007v1, pp. 1-18, Jun. 1, 2001.

* cited by examiner

*Primary Examiner* — Nathan Curs
*Assistant Examiner* — Tanya Ngo
(74) *Attorney, Agent, or Firm* — Opticus IP Law PLLC

(57) ABSTRACT

A QKD system (10) having two QKD stations (Alice and Bob) optically coupled by an optical fiber link (FL), wherein Bob includes a variable timing delay arranged between Bob's controller (CB) and modulator (MB) or detector unit (40). A set-up and calibration procedure is performed wherein delay DL2 is adjusted until the timings for the modulator and detector unit ($T_{SB}$ and $T_{S42}$, respectively) are established. Delay DL2 is then fixed so that the detector unit and modulator operate in a common timing mode that is not changed if the synchronization signal is changed. The timing $T_{SS}$ of the synchronization (sync) signals (SS) sent from Alice to Bob is adjusted to arrive at optimum system performance. Once the QKD system is in operation, because the sync signal can drift, the sync signal timing $T_{SS}$ is dithered maintain optimum QKD system performance. Since the modulator and detector unit timing is tied together, dithering the sync signal also dithers the modulator and detector unit together in a "common mode," rather than varying the timing of each of these elements separately.

20 Claims, 2 Drawing Sheets

QKD SYSTEM WITH COMMON-MODE DITHERING

FIELD OF THE INVENTION

The present invention relates to quantum cryptography, and in particular relates to quantum key distribution (QKD) systems, and systems for and methods of maintaining the performance of same during operation.

BACKGROUND OF THE INVENTION

Quantum key distribution (QKD) involves establishing a key between a sender ("Alice") and a receiver ("Bob") by using weak (i.e., 1 photon or less, on average, and typically 0.1 photon on average) optical signals or "qubits" transmitted over a "quantum channel." Rather than relying on computational impracticality, the security of the key distribution is based on the quantum mechanical principle that any measurement of a quantum system in an unknown state will modify its state. Thus, an eavesdropper ("Eve") that attempts to intercept or otherwise measure the exchanged qubits will introduce errors that reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett, and in the article by C. H. Bennett entitled "Quantum Cryptography Using Any Two Non-Orthogonal States", Phys. Rev. Lett. 68 3121 (1992). The general process for performing QKD is described in the book by Bouwmeester et al., "The Physics of Quantum Information," Springer-Verlag 2001, in Section 2.3, pages 27-33.

The above mentioned references by Bennett each describe a QKD system wherein Alice randomly encodes the polarization or phase of single photons at one end of the system, and Bob randomly measures the polarization or phase of the photons at the other end of the system. The one-way system described in the Bennett 1992 paper is based on two optical fiber Mach-Zehnder interferometers. Respective parts of the interferometric system are accessible by Alice and Bob so that each can control the phase of the interferometer. The interferometers need to be actively stabilized to within a portion of quantum signal wavelength during transmission to compensate for thermal drifts.

U.S. Pat. No. 6,438,234 to Gisin (the '234 patent) discloses a so-called "two-way" QKD system that employs an auto-compensating interferometer of the type invented by Dr. Joachim Meier of Germany and published in 1995 (in German) as "Stabile Interferometrie des nichtlinearen Brechzahl-Koeffizienten von Quarzglasfasern der optischen Nachrichtentechnik," Joachim Meier. —Als Ms. gedr.—Düsseldorf: VDI-Verl., Nr. 443, 1995 (ISBN 3-18-344308-2). Because the Meier interferometer is autocompensated, the two-way QKD system based thereon is generally less susceptible to environmental effects than a one-way system.

In a typical QKD system, Alice generates a quantum signal and randomly modulates this signal based on a select number of possible basis modulations. This process is referred to herein as "selective random modulation." The once-modulated quantum signal is then sent to Bob, who receives this signal and selectively randomly modulates it to form a twice-modulated quantum signal. The twice-modulated quantum signal is then detected at Bob at one of two single-photon detectors (SPDs). Bob is arranged so that an overall modulation of one value (e.g., an overall phase modulation of 0) is detected at one of SPD, while an overall modulation of another value (e.g., an overall phase modulation of $\pi/2$) is detected at the other SPD. This quantum signal exchange process is repeated for a large number of photons (e.g., $10^4$ photons), and known QKD protocols and procedures (e.g., sifting, error correction, privacy amplification, etc., as described in the above-cited reference by Bouwmeester et al.) are then followed to establish a secure "quantum key" between Alice and Bob.

The operation of the QKD system relies on the synchronized operation of its key active elements—namely, the light source, the modulators and the SPDs. The activation of the key elements is based on the expected arrival times of the quantum signals (photons). While it may be fairly straightforward to operate a QKD system in a laboratory environment with rudimentary synchronization of the aforementioned active elements, a commercially viable QKD system needs to have a simple and robust synchronization system that can be adjusted to maintain the stability of the QKD system over time, as well as provide for ongoing efficient (e.g., optimized) system performance. This is true even for the so-called autocompensated system, because the "autocompensation" applies to the quantum signals and not to the synchronization signals used to coordinate system operation.

SUMMARY OF THE INVENTION

An aspect of the present invention is a method of operating a QKD system that includes first and second QKD stations (Alice and Bob) optically coupled to one another, with Bob comprising a controller, a detector unit and a phase modulator. The method includes setting a timing $T_{SS}$ of synchronization (sync) signals SS that travel between Alice and Bob. The method further includes sending optical signals from Alice to Bob to establish a timing $T_{SB}$ of a phase modulator activation signal SB and a timing $T_{S40}$ of a detector gating signal S42 based on the sync signals SS, wherein established timings $T_{SB}$ and $T_{S40}$ correspond to maximum number of optical signal counts $N_{MAX}$. The method also includes fixing the relative timing $\Delta T_{F1}$ between the signals SB and S42 so that a change in sync signal timing $T_{SS}$ does not change $\Delta T_{F1}$.

Another aspect of the invention is a QKD station (Bob) operably couplable to another QKD station (Alice) via an optical fiber link and a synchronization channel that supports synchronization (sync) signals having a timing $T_{SS}$. The QKD station includes a modulator adapted to receive and selectively randomly modulate quantum signals sent by Alice to Bob over the optical fiber link and a detector unit optically coupled to the modulator. The QKD station also includes a controller operably coupled to the detector unit and the modulator. A variable delay is arranged between the controller and either the detector unit or the modulator. The variable delay is set to define a fixed timing interval $\Delta T_{F1}$ between a timing $T_{SB}$ for a modulator activation signal SB and a timing $T_{S42}$ for a detector gating signal S42 that corresponds to an optimum detector count $N_{MAX}$ from the detector unit. A change in the sync signal timing $T_{SS}$ does not cause a change in the fixed timing interval $\Delta T_{F1}$, which allows for Bob's modulator and detector unit to be dithered in a "common mode" simply by dithering the sync signal timing.

Figure 1:
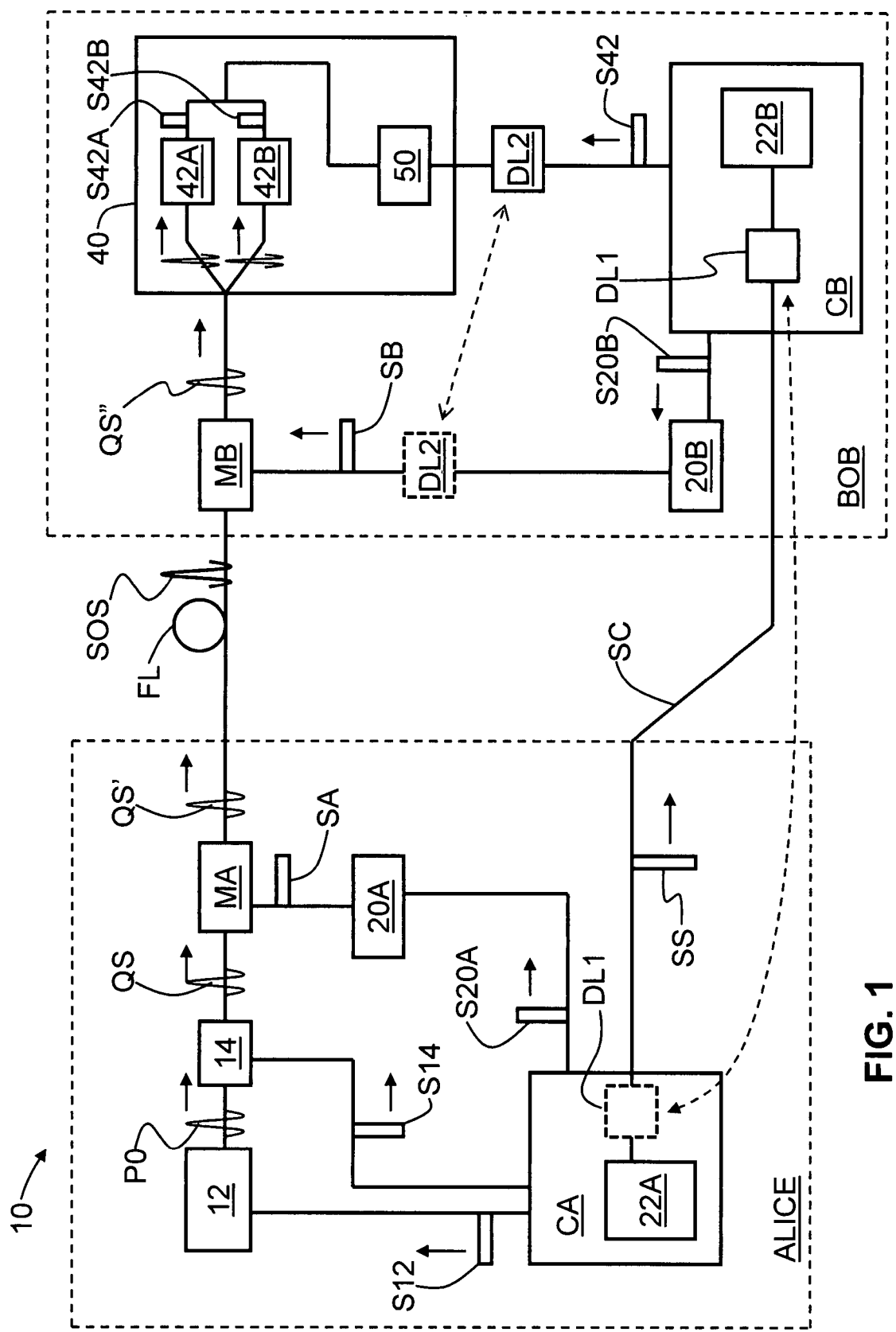
FIG. 1 is a schematic diagram of an example QKD system according to the present invention, illustrating the key elements of the QKD system that allow for the system to perform common-mode dithering.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

In the Figures, like elements are identified by like reference numbers.

DETAILED DESCRIPTION OF THE INVENTION

FIG. 1 is a schematic diagram of an example QKD system 10 according to the present invention, illustrating the key elements of the QKD system that allow the system to operate using the common-mode dithering method of the present invention. QKD system 10 includes a first QKD station Alice optically coupled to a second QKD station Bob via an optical fiber link FL.

Alice

Alice includes a light source 12, a variable optical attenuator 14 arranged downstream of and optically coupled to the light source, and a phase modulator MA arranged downstream of and optically coupled to the VOA. Phase modulator MA is optically coupled to optical fiber link FL and is operably coupled to a modulator driver 20A.

Alice further includes a controller CA operably coupled to light source 12, VOA 14 and modulator driver 20A. Controller CA controls the operation of light source 12 and modulator driver 20A via respective timed control signals S12 and S20A. VOA 14 is controlled so as to have a select attenuation by a control signal S14 from controller CA. In an example embodiment, controller CA includes a field-programmable gate array (FPGA) 22A programmed to control the operation of Alice, as well as to communicate with Bob's controller (discussed below) in coordinating the overall operation of QKD system 10. Controller CA (or Bob's controller CB, as described below) also includes a variable delay DL1 operably arranged in a synchronization ("sync") channel SC that connects to Alice to Bob and carries sync signals SS used to coordinate the operation of key active elements of QKD system 10. In an example embodiment, delay DL1 is or includes an electronic circuit adapted to impart a given time delay to an electronic signal passing therethrough, and in particular is adapted to dither the electronic signal. Delay DL1 can be arranged anywhere between Alice's controller CA and Bob's controller CB.

Bob

With continuing reference to FIG. 1, Bob includes a phase modulator MB optically coupled to optical fiber link FL and also operably coupled to a modulator driver 20B. Bob also includes a detector unit 40 optically coupled to phase modulator MB. In an example embodiment, detector unit 40 includes two single-photon detectors (SPDs) 42A and 42B. A discriminator 50 is operably coupled to SPDs 42A and 42B.

Bob also includes a controller CB operably coupled to modulator driver 20B and detector unit 40, as well as to Alice's controller CA via synchronization channel SC. In an example embodiment, Bob's controller CB includes a FPGA 22B programmed to control the operation of Bob, as well as communicate with Alice over synchronization channel SC via synchronization ("sync") signals SS. Bob rather than Alice may include variable delay DL1 and control the operation of this variable delay as described below.

Though synchronization channel SC and optical fiber link FL are shown as separate connections for the sake of illustration, in an example embodiment the synchronization channel is carried multiplexed over the optical fiber link (i.e., the optical fiber link carries both the quantum channel and the synchronization channel).

Bob also includes an adjustable electronic delay element ("delay") DL. In an example embodiment, delay DL2 is or includes an electronic circuit adapted to impart a given time delay to an electronic signal passing therethrough. Delay DL2 can be arranged between controller CB and phase modulator MB or between controller CB and SPD unit 40.

QKD System General Method of Operation

The operation of QKD system 10 is now described, assuming for the moment that delay DL2 is set to zero and that the system is ready to operate (i.e., is set up and calibrated). Controller CA sends signal S12 to light source 12 to initiate the generation of an optical pulse P0. Controller CA records the timing $T_{S12}$ at which signal S12 was generated. Optical pulse P0 travels through VOA 14 and is attenuated thereby to form a quantum signal (pulse) QS having a mean photon number µ of 1 photon or less on average, and preferably on the order of 0.1 photon on average.

Quantum signal QS passes through phase modulator MA, which is activated based on the expected arrival time of the quantum signal. Specifically, controller CA generates control signal S20A, which activates modulator driver 20A to generate a voltage signal SA representative of a phase randomly selected from a set of basis phase modulations (voltages). The selectively randomly modulated quantum signal QS' then enters optical fiber link FL and travels over to Bob.

At Bob, quantum signal QS' is modulated in essentially the same way via controller CB, which sends a modulator control signal S20B timed to the expected arrival of quantum signal QS at modulator MA. Modulator control signal activate modulator driver 20B, which generates a voltage signal SB (hereinafter, the "modulator activation signal") representative of a phase randomly selected from a set of basis phase modulations (voltages), thereby selectively randomly modulating quantum signal QS' to form a twice-modulated quantum signal Q". Modulator activation signal SB has an associated timing $T_{SB}$ and a (gating) width $\Delta T_{SB}$, wherein timing $T_{SB}$ coincides with the arrival time of quantum signal QS' at modulator MB. Gating width $\Delta T_{SB}$ is sized to account for uncertainty in the arrival time of the quantum signal.

Twice-modulated quantum signal QS" then proceeds to detector unit 40. Depending on the overall phase imparted to quantum signal QS", a click will register in one of SPDs 42A and 42B. SPDs 42A and 42B generate corresponding detector signals S42A and S42B that travel to discriminator 50. Discriminator 50 is used to ensure that two detector signals are not generated at the same time, e.g., due to dark count errors. If only one detector signal S42A or S42B is detected at discriminator 50, the signal is passed to controller CB, which receives and processes the signal e.g., records in FPGA 22B the modulation state of modulator MB, which of the SPDs clicked, and which quantum signal QS" in the stream of quantum signals was detected.

SPDs 42A and 42B in detector unit 40 are gated via a detector gating signal S42 from controller CB. Gating signal S42 has an associated timing $T_{S42}$ and a gating width $\Delta T_{S42}$. Detector gating signal S42 is timed to the expected arrival time of twice-modulated quantum signal QS". The detector gating width $\Delta T_{S42}$ is sized to accommodate uncertainty in the arrival time of quantum signal QS". In an example embodiment, the detector gating signal timing $T_{S42}$ is established by sync signal SS sent from Bob to Alice. The timing $T_{SS}$ of sync signal SS, in turn, is based on the timing $T_{S12}$ of control signal S12 sent to light source 12 to generate initial optical pulse P0.

QKD System Calibration

The above description of the operation of QKD system 10 assumed that delays DL1 and DL2 were zero, and that the QKD system was already set up to operate in its normal operating condition. However, in the present invention, delays DL1 and DL2 are used to set up and calibrate the QKD system and then maintain QKD system performance in a desired state, which is usually the optimum operating state as reflected by a maximum number $N_{MAX}$ of SPD counts from detector unit 40 for a given operating time interval (e.g., minutes). This is accomplished by using variable delay DL1 at Alice or Bob to dither the timing of sync signal SS.

Figure 2:
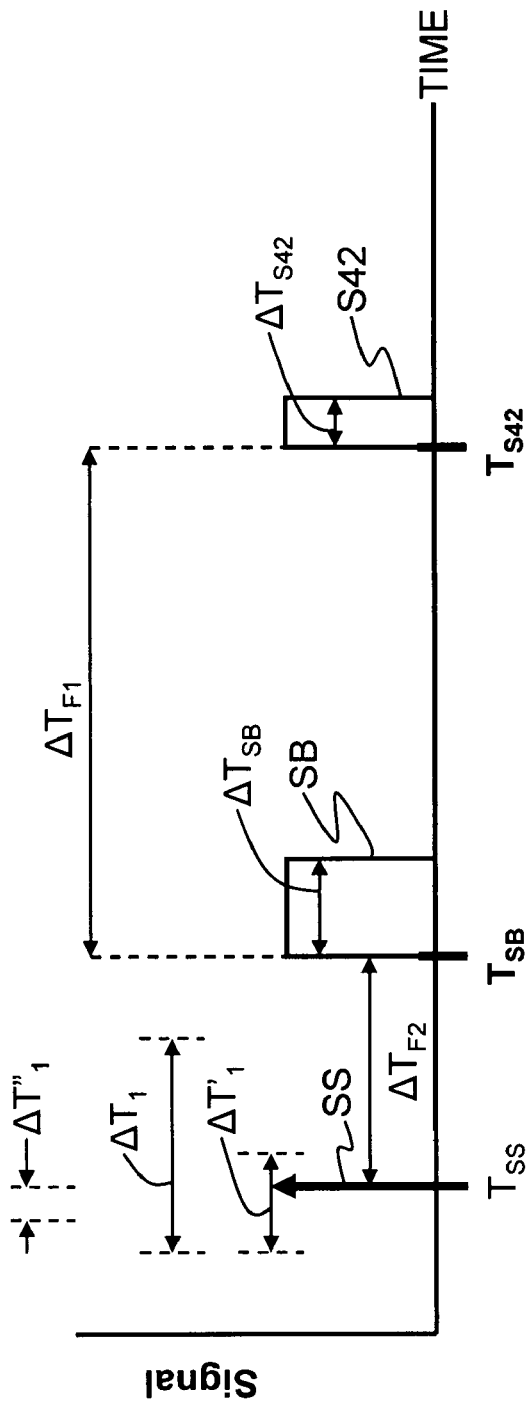
FIG. 2 is a timing diagram of the sync signal (SS) along with the modulator signal (SB) and the detector gating signal (S42), illustrating the common mode dithering of the modulator (MB) and single-photon detectors (42A, 42B) by dithering the sync signal.

The discussion below makes reference to FIG. 1 and also to FIG. 2, the latter being a timing diagram of the sync signal SS, the modulator activation signal SB and the detector gating signal S42.

Set-up and calibration of QKD system 10 involves performing a first step that includes setting an initial sync signal timing $T_{SS}$ and setting gating widths $\Delta T_{SB}$ and $\Delta T_{S42}$ to be relatively wide to account for the relatively large timing uncertainty in this initial set-up stage. Variable delay DL1 is initially set to have zero delay (i.e., no dithering)

The system is then operated while varying the variable delay DL2 at Bob until the activation of phase modulator MB via modulation signal SB and the gating of detectors 42A and 42B via gating signal S42 is properly coordinated, e.g., until a maximum photon count $N_{MAX}$ is obtained. In an example embodiment, relatively strong (e.g., non-quantum) optical signals SOS are sent by Alice. In an example embodiment, strong optical signals SOS are generated by reducing the amount of attenuation applied by VOA 14 via control signal S14 so that initial optical pulses P0 retain a larger portion of their power.

Further in an example embodiment, Alice's modulator MA is set to a fixed value so that only Bob's modulator MB is activated. In addition, only a single modulation value is preferably used for modulator MB so that the maximum interference is obtained at detector unit 40.

This establishes the coarse timing $T_{SB}$ and coarse modulator gating width $\Delta T_{SB}$ for Bob's modulator MB and the timing $T_{S42}$ and coarse detector gating width $\Delta T_{S42}$ for SPDs 42.

Also in an example embodiment, the final modulator gating width $\Delta T_{SB}$ of modulator activation signal SB and the final detector gating width $\Delta T_{S42}$ of detector gating signal S42 are established by starting with relatively large (coarse) gating widths and then repeating the above process with narrower gating widths until the minimum acceptable gating width for each is established.

Once the modulator and detector gating widths are established and the appropriate timing interval $\Delta T_{F1}$ between signals SB and S42 is established (FIG. 2), variable delay DL2 is then fixed so that the timing interval $\Delta T_{F1}$ is also fixed. At this point, controller CB is configured so that triggering modulator MB via modulator activation signal SB is tied directly to the gating of SPDs 42A and 42B rather than on sync signal SS being received by controller CB. Thus, when controller CB generates detector gating signal S42 in response to sync signal SS, it simultaneously generates signal S20B, which in turn generates modulator activation signal SB. In an example embodiment, modulator control signal S20B is preferably just a replicated version of gating signal S42.

Because the timing interval $\Delta T_{F1}$ between the activation of modulator MB and the gating of SPDs 42A and 42B is fixed, the modulator and SPDs operate in a "common mode," as opposed to their timing being varied independently and relying independently on the timing $T_{SS}$ of sync signal SS.

In an example embodiment of the second step of the set-up and calibration procedure, Bob's modulator MB is set to a fixed value, and relatively strong (i.e., non-quantum) optical signals are exchanged between Alice and Bob to ascertain the proper timing $T_{MA}$ for Alice's modulator MA.

The varying of the sync signal timing $T_{SS}$ within a coarse timing interval $\Delta T_1$ (e.g., using variable delay DL1) is carried out until optimum performance is obtained, e.g., as reflected by a maximum photon count $N_{MAX}$. In an example embodiment, timing interval $\Delta T_1$ is then reduced repeatedly (to $\Delta T'_1$, $\Delta T''_1$, etc.) and the process repeated as many times as necessary to hone in on a precise sync signal timing $T_{SS}$. Once the sync signal timing TSS is established in this iterative fashion, then the system timing is set and the QKD system is ready for operation.

QKD Operation with Common-Mode Dithering

Figure 3:
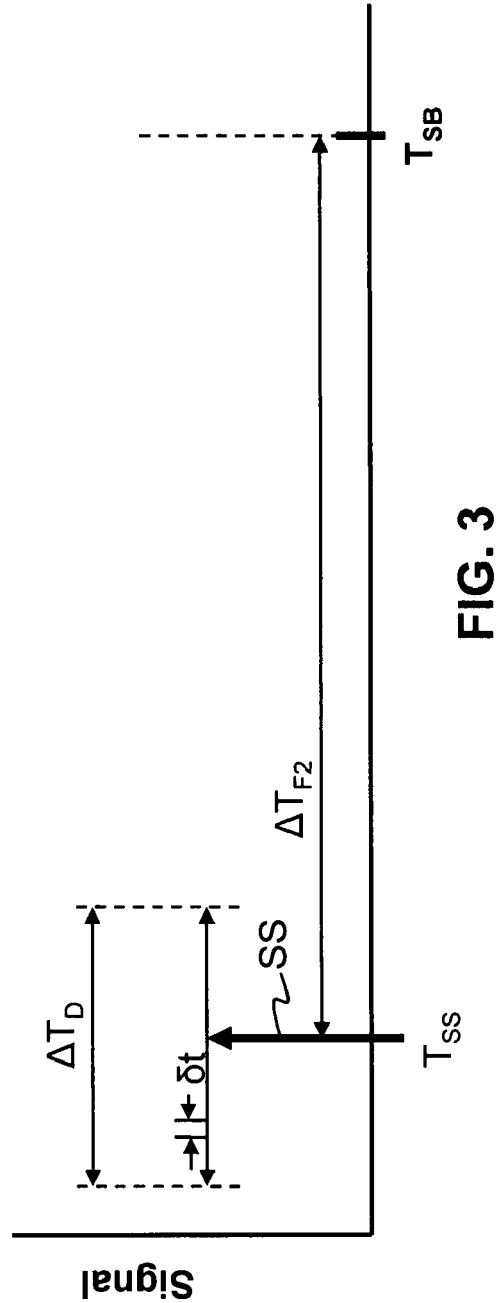
FIG. 3 is a timing diagram similar to FIG. 2 and illustrates an embodiment of dithering the sync signal timing $T_{SS}$ back and forth in small time increments δt over a dither interval $\Delta T_D$, and operating the QKD system for the different values of $T_{SS} \pm n\delta t$ (where n is an integer) to establish whether or not it is necessary to set $T_{SS}$ to a new value that optimizes QKD system performance.

Once QKD system 10 is set up and calibrated as described above, then with reference also to the timing diagram of FIG. 3, in an example embodiment the system is then operated with set delay DL2 for an initial operation time $T_O$, say a few minutes. After time $T_O$, either Bob's controller or Alice's controller, depending on the location of variable delay DL1, causes this variable delay to dither the sync signal timing $T_{SS}$ back and forth in small time increments δt over a dither interval $\Delta T_D$. The QKD system is operated for the different values of $T_{SS} \pm n\delta t$ (where n is an integer) to establish whether or not it is necessary to set $T_{SS}$ to a new value that optimizes QKD system performance, e.g., one that leads to an increased photon (detector) count N. Note that the timing interval $\Delta T_{F1}$ between the activation of modulator MB and the gating of SPDs 42A and 42B remains fixed while only the sync signal timing is dithered.

If necessary, the sync-signal dithering process is repeated during QKD system operation. The dithering process may be repeated periodically or a periodically, such as when the detector count N drops by a threshold number of counts $N_{TH}$ from a maximum number of detector counts $N_{MAX}$ over a given time interval.

The sync-signal dithering process provides for common-mode dithering of the modulator timing and the SPD timing, since the timing interval $\Delta T_{F1}$ between modulator MB and SPDs 42A and 42B is fixed. This allows for a single dithering operation performed on the sync signal SS at Alice or Bob to maintain optimum performance of the QKD system without the need to independently vary the timing of the other elements, particularly Bob's modulator and SPD unit. This is possible because the timing of modulator MB and SPDs 42A and 42B generally remains unchanged, with most of the timing variation in the QKD system being due to variations in the transmission of sync signal $T_{SS}$ timing over a long fiber that experiences regular temperature change. However, the relative timing of modulator MB and SPDs 42A and 42B initially needs to be adjustable using variable delay DL2 to establish proper timing set-up and calibration of the QKD system as a whole, and to make any necessary adjustments in modulator and/or detector timing at Bob should these elements experience a timing drift.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A method of operating a quantum key distribution (QKD) system that includes first and second QKD stations (Alice and Bob) optically coupled to one another, with Bob comprising a controller, a detector unit and a phase modulator MB, the method comprising:

setting a timing $T_{SS}$ of synchronization (sync) signals SS that travel between Alice and Bob;

sending optical signals from Alice to Bob to establish a timing $T_{SB}$ of a phase modulator activation signal SB for the phase modulator MB and a timing $T_{S40}$ of a detector gating signal S42 for the detector unit based on said sync signals SS, wherein established timings $T_{SB}$ and $T_{S40}$ correspond to maximum number of optical signal detector counts $N_{MAX}$ of the optical signals;

fixing a relative timing $\Delta T_{F1}$ between the signals SB and S42 so that a change in sync signal timing $T_{SS}$ does not change $\Delta T_{F1}$; and after fixing the relative timing $\Delta T_{F1}$, operating the QKD system using quantum signals, and dithering the timing $T_{SS}$ of the synchronization signals SS to maintain an optimum sync signal timing $T_{SS}$ without changing the relative timing $\Delta T_{F1}$ between signals SB and S42.

2. The method of claim 1, wherein the optical signals used to establish timings $T_{S40}$ and $T_{SB}$ are strong (non-quantum) optical signals.

3. The method of claim 1, further including setting a width $\Delta T_{SB}$ to the phase modulator activation signal SB and a width $\Delta T_{S42}$ to the detector gating signal S42.

4. The method of claim 1, wherein Alice includes a modulator MA, and including fixing a modulation value for modulator MA when establish the timing $T_{SB}$ and the timing $T_{S40}$.

5. The method of claim 4, including providing no modulation for the modulator MA.

6. The method of claim 1, including fixing a modulation value for the phase modulator MB when establish the timing $T_{SB}$ and the timing $T_{S40}$.

7. The method of claim 1, wherein said dithering is performed at different times during the operation of the QKD system.

8. The method of claim 1, wherein said dithering is performed periodically during the operation of the QKD system.

9. The method of claim 7, wherein the optimum performance corresponds to a maximum number $N_{MAX}$ of detector counts N from the detector unit, and further comprising performing said dithering when the detector count N drops from a maximum number of detector counts $N_{MAX}$ by a threshold number of detector counts $N_{TH}$.

10. A quantum key distribution (QKD) station (Bob) operably couplable to another QKD station (Alice) via an optical fiber link and a synchronization channel that supports synchronization (sync) signals having a timing $T_{SS}$, the QKD station (Bob) comprising:

a modulator adapted to receive and selectively randomly modulate quantum signals sent by Alice to Bob over the optical fiber link;

a detector unit optically coupled to the modulator;

a controller operably coupled to the detector unit and the modulator;

a variable delay arranged between the controller and either the detector unit or the modulator, wherein the variable delay is set to define a fixed timing interval $\Delta T_{F1}$ between a timing $T_{SB}$ for a modulator activation signal SB for the modulator and a timing $T_{S42}$ for a detector gating signal S42 for the detector unit that corresponds to an optimum detector count $N_{MAX}$ from the detector unit; and wherein a change in the sync signal timing $T_{SS}$ does not cause a change in the fixed timing interval $\Delta T_{F1}$.

11. The QKD station (Bob) of claim 10, wherein the change in the sync signal timing includes dithering the sync signal timing.

12. The QKD station (Bob) of claim 11, further including another variable delay adapted to perform the dithering of the sync signal timing.

13. The QKD station (Bob) of claim 10, wherein the detector unit includes first and second single-photon detectors (SPDs).

14. A QKD system, including:
the QKD station (Bob) of claim 10;
the another QKD station (Alice); and
the optical fiber link and synchronization channel that operably couple the QKD station (Bob) and the another QKD station (Alice).

15. The QKD system of claim 14, wherein the optical fiber link carries the synchronization channel.

16. A QKD system, including:
the QKD station (Bob) of claim 11;
the another QKD station Alice (Alice);
the optical fiber link and synchronization channel that operably couple the QKD station (Bob) and the another QKD station (Alice); and
wherein the another QKD station (Alice) includes another variable delay and a controller operably coupled to the another variable delay to perform the dithering of the sync signal timing.

17. The method of claim 1, further comprising:
during the operating of the QKD system, the controller simultaneously generating the phase modulator activation signal SB and the detector gating signal S42; and
passing at least one of the modulator activation signal SB and the detector gating signal S42 through at least one delay that defines the relative timing $\Delta T_{F1}$.

18. The method of claim 1, wherein establishing the timing $T_{SB}$ of the phase modulator activation signal SB and the detector gating signal $S_{42}$ includes passing at least one of the modulator activation signal SB and the detector gating signal $S_{42}$ through at least one variable delay.

19. The method of claim 1, further comprising providing the detector counts from at least one single-photon detector (SPD) in the detector unit.

20. The QKD system (Bob) of claim 10, further comprising the controller being configured to simultaneously generate the phase modulator activation signal SB and the detector gating signal S42, with the set variable delay arranged to impart a delay between the phase modulator activation signal SB and the detector gating signal S42 corresponding to the timing interval $\Delta T_{F1}$.

* * * * *